US010705583B2

(12) United States Patent
Brewer et al.

(10) Patent No.: US 10,705,583 B2
(45) Date of Patent: Jul. 7, 2020

(54) MANAGEMENT OF FINITE ELECTRICAL CELLS

(71) Applicant: International Business Machines Corporation, Armonk, NY (US)

(72) Inventors: Derek R. Brewer, Bowling Green, OH (US); Paul M. Crutcher, Rochester, MN (US); Kerry M. Langford, Rochester, MN (US); Robert D. Wilhelm, Cheyenne, WY (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 15/016,307

(22) Filed: Feb. 5, 2016

(65) Prior Publication Data

US 2017/0228003 A1   Aug. 10, 2017

(51) Int. Cl.
*G06F 1/26* (2006.01)
*G06F 1/32* (2019.01)
*G06F 1/3212* (2019.01)

(52) U.S. Cl.
CPC ........... *G06F 1/266* (2013.01); *G06F 1/3212* (2013.01); *Y02D 10/174* (2018.01)

(58) Field of Classification Search
CPC .... H02J 7/007; H02J 50/80; H02J 2007/0096; H02J 50/40; H02J 7/0036; H02J 7/0008; H02J 7/0013; H01M 10/44; G06F 1/266; G06F 1/3212
See application file for complete search history.

(56) References Cited

U.S. PATENT DOCUMENTS

| | | | |
|---|---|---|---|
| 6,946,817 B2 | 9/2005 | Fischer et al. | |
| 7,450,991 B2 | 11/2008 | Smith et al. | |
| 7,554,288 B2 | 6/2009 | Gangstoe et al. | |
| 8,805,457 B2 | 8/2014 | Sarker | |
| 2006/0103344 A1* | 5/2006 | Hassan | G06F 1/266 320/103 |
| 2008/0174278 A1 | 7/2008 | Masias et al. | |
| 2010/0134305 A1 | 6/2010 | Lu et al. | |
| 2011/0006603 A1* | 1/2011 | Robinson | G06F 1/263 307/31 |
| 2012/0019193 A1* | 1/2012 | Yu | G06F 1/266 320/103 |

(Continued)

FOREIGN PATENT DOCUMENTS

| | | |
|---|---|---|
| EP | 1072285 A1 | 1/2001 |
| WO | 2010024892 A1 | 3/2010 |

(Continued)

OTHER PUBLICATIONS

Hild et al., "Smart Charging Technologies for Portable Electronic Devices", IEEE Transactions on Smart Grid, vol. 5, No. 1, Jan. 2014, pp. 328-336, © 2013 IEEE.

*Primary Examiner* — Xuxing Chen
(74) *Attorney, Agent, or Firm* — Peter J. Edwards

(57) ABSTRACT

A consumption device may be detected by a processor. At least one property of the consumption device may be determined. Based on that property, a power configuration for the consumption device may be determined. The processor may permit a finite electrical cell associated with the processor to power the consumption device according to that power configuration.

17 Claims, 9 Drawing Sheets

(56) References Cited

U.S. PATENT DOCUMENTS

| | | | |
|---|---|---|---|
| 2013/0009468 A1* | 1/2013 | Ishidera | H01M 10/44 307/24 |
| 2013/0082662 A1 | 4/2013 | Carre et al. | |
| 2013/0124000 A1* | 5/2013 | Matsumoto | H02J 9/062 700/295 |
| 2013/0300348 A1 | 11/2013 | Schwartz et al. | |
| 2015/0244185 A1* | 8/2015 | Won | G06F 1/266 320/103 |
| 2015/0380971 A1* | 12/2015 | Priev | H02J 7/025 320/108 |
| 2016/0036259 A1* | 2/2016 | Cheatham, III | H02J 7/0004 320/103 |

FOREIGN PATENT DOCUMENTS

| | | |
|---|---|---|
| WO | 2012173843 A2 | 12/2012 |
| WO | 2014149809 A2 | 9/2014 |

* cited by examiner

MANAGEMENT OF FINITE ELECTRICAL CELLS

BACKGROUND

The present disclosure relates to finite electrical cells, and more specifically, to the management of the charging and powering of consumption devices by finite electrical cells.

Portable solutions for powering and recharging electronic devices typically are unable to differentiate between one electronic device and another. Users depending on these portable solutions to power or recharge their electronic devices typically keep a surplus of powering sources on hand or keep close track of the use of their power sources to increase the chances that sufficient charge will be available for their most important devices.

SUMMARY

Some embodiments of the disclosure can be illustrated by a method, system, or computer program product. In the method, system, or computer program product, a consumption device may be detected by a processor. At least one property of the consumption device may be determined. Based on that property, a power configuration of the consumption device may be determined. The processor may permit a finite electrical cell associated with that processor to power the consumption device according to that power configuration.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
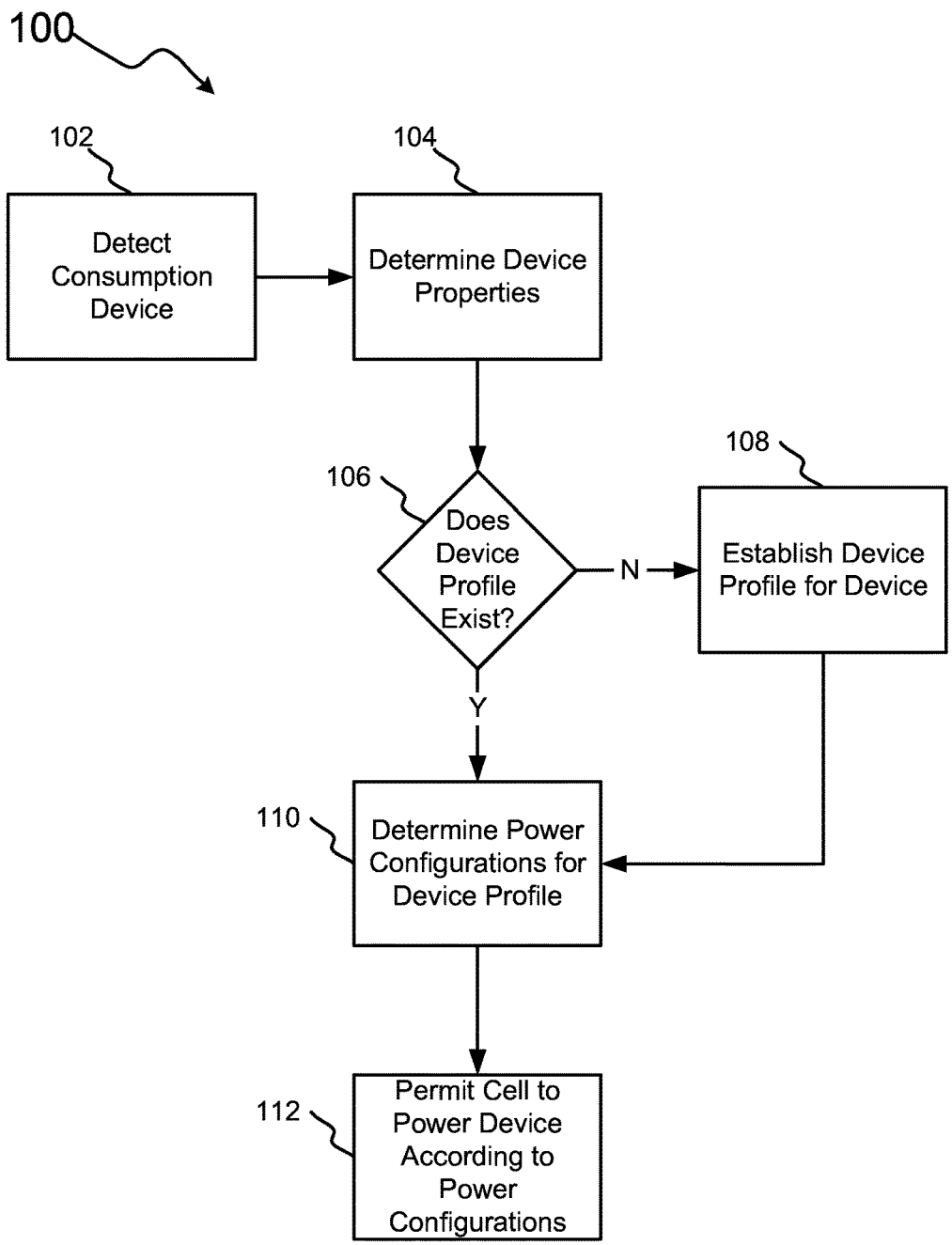
FIG. 1 depicts a method that a power manager may use to manage the device-powering activities of a finite electrical cell, in accordance with embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to finite electrical cells, and more specifically, to the management of the charging and powering of consumption devices by finite electrical cells. While the present disclosure is not necessarily limited to such applications, various aspects of the disclosure may be appreciated through a discussion of various examples using this context.

As the amount of portable electronics in everyday use by the average person increases, the demand for sources by which to power those portable electronics (often referred to herein as "consumption devices" or "devices") increases. When power directly sourced from a power grid (e.g., from a wall outlet) is unavailable or otherwise undesirable, the average portable-electronics user may rely on electrical cells with a finite energy-storage capacity (e.g., disposable batteries, rechargeable batteries, portable power banks, and back-up mobile chargers) to power the operations of consumption devices or the recharging of consumption-device internal batteries. In some cases the amount of charge stored in a user's finite electrical cell may be depleted before the user is able to power his or her most important consumption devices, causing those devices to become unavailable. The charge in a finite electrical cell is often referred to herein as the "remaining charge," and referenced herein as a percentage of the charge of a full electrical cell or as a number of Coulombs. Finite electrical cells are often referred to herein as "electrical cells," "cells," "chargers" and "batteries." Typical batteries are not capable of making powering decisions based on either the identity of the electronic device or the amount of remaining charge in the battery. Thus, typical batteries are unable to ensure, without careful attention by the user, that sufficient power will be reserved for a user's most important electronic devices.

Some embodiments of the present disclosure may improve upon the powering of portable electronics by, for example, managing the consumption-device powering activities of a finite electrical cell with a power manager. This power manager may identify properties of electronic devices that are attached to the finite electrical cell and that require power. A user may establish power configurations for consumption devices for specific properties or for specific devices using the power manager. The power manager may be configured to make charging decisions and enable an electrical cell to power (or prohibit the electrical cell from powering) or powering a device based on identified device properties of the device. In some embodiments, the power manager may enable the finite electrical cell to power a consumption device by creating an electrical connection between the cell and the device (i.e., by closing a circuit on which both the cell and device are located). Similarly, the power manager may prohibit the cell from powering a device by interrupting an electrical connection between the cell and the device (i.e., by opening a circuit on which both the cell and device are located). In some embodiments discussed herein, the default status of a circuit between a cell and device may be "open" (i.e., powering prohibited) when a consumption device is connected, whereas in others the default status may be "closed" (i.e., powering enabled).

The power manager may be configured to rank the powering priority of connected consumption devices based on device properties. The power manager may also have the capability to track the remaining charge of the finite electrical cell and to disable the charging or powering of low-priority devices when the remaining charge drops below a certain threshold. This may provide the availability of sufficient remaining charge for the powering of devices with high powering priorities, even when many devices are powered with one finite electrical cell.

In applicable embodiments and as discussed herein, the power manager may communicate with either the finite electrical cell or the consumption device through any known wired or wireless interfaces (e.g., direct coupling, cable coupling, near-field communication, a Wi-Fi network, a cellular network, short message service, proprietary wireless connection, over a local intranet, over the Internet, or others).

In some embodiments the power manager may take the form of a dedicated hardware device with which a finite electrical cell may be permanently or temporarily coupled (e.g., a portable mobile-phone charger or an attachment thereto). In other embodiments the power manager may be a processor configured to manage the powering activities of a finite electrical cell. For example, a power manager may be a processor in a portable computer (e.g., a laptop, tablet, mobile phone), in which case the processor may manage the powering activities of the portable computer's battery, of a different battery, or both. In some such embodiments the power manager may have a dedicated power supply (e.g., a battery that powers only the power manager), whereas in other embodiments the power manager may be powered by the same finite electrical cell that the power manager is managing.

A power manager, according to embodiments of the present disclosure, may manage the device-powering activities of a finite electrical cell. Unless otherwise noted, the terms "powering" or "charging" a device should both be interpreted as encompassing either of recharging a device or otherwise providing a device with its operating energy needs (i.e., recharging the internal battery of a consumption device or powering a consumption device as it is used, regardless of whether that consumption device has an internal battery to be charged).

FIG. 1 depicts a logic-flow diagram illustrating a method 100 that a power manager may use to manage the charging and powering activities of an electrical cell. In block 102 the power manager detects that a consumption device is connected to the battery. This connection may be any means over which electrical charge may be transferred from the finite electrical cell to the consumption device. In some embodiments this may take the form of a flexible attachment, such as a charging cord, and in others it may take the form of a more direct coupling, such as a battery pack that clamps on to a consumption device. In some embodiments this attachment may take the form of a generic interface, such as a generic charging cord, whereas in other embodiments it may take the form of a standardized interface, such as a USB plug. The consumption device may couple to the power manager in some embodiments, which may act as an intermediary between the consumption device and the finite electrical cell. In other embodiments the consumption device may couple to the finite electrical cell. In these embodiments the power manager may communicate with the consumption device separately, such as through a wireless connection to detect the consumption device.

Upon detecting a connected consumption device, the power manager attempts to determine the consumption device's properties in block 104. The device properties determined by the power manager may include device type (e.g, manufacturer and model number), device identity (e.g., serial number), level of charge (e.g., whether the device is fully charged, half charged, or depleted), and powering properties (e.g., the maximum voltage and amperage at which the device may receive charge from the finite electrical cell).

In some embodiments, many contemporary consumption devices may be configured by the device manufacturer to communicate the necessary device properties automatically upon connection over certain connection types (e.g., a smartphone over Bluetooth or a fitness-tracking device over USB), whereas in some embodiments the desired device properties may not be sent by default. For example, in some embodiments it may be beneficial for the power manager to differentiate devices by the owner of the device. In some embodiments it may also be beneficial for a consumption device to request specific powering conditions, or conditions under which the power manager would restrict the electrical cell from powering the device. For example, a device with an internal battery may request 200 Coulombs (200 C) from the power manager, rather than a full charge. In these or similar embodiments an application may be installed on the device to communicate the desired properties to the power manager upon connection.

In further embodiments consumption-device properties may not be sent to the power manager by the consumption device directly, but may be entered by the user upon connection of the consumption device to the power manager or finite electrical cell. In these embodiments, the user may enter the information on some kind of physical interface on the housing of the power manager itself, or may enter it on a graphic user interface that is integrated with the power manager housing or presented remotely, such as on a computer or tablet.

Once the power manager determines the consumption device's properties (or identifies the inability to determine the consumption device's properties), it determines in block 106 whether a device profile has been configured for (or assigned to) that device. In different embodiments device profiles may vary. For example, if a device property identifies the consumption device as the user's medical device, the consumption device may fall under a "high-priority device" profile. If the device property is that the consumption device is already 90% charged, however, the consumption device may fall under an "already charged" profile. In some such embodiments, the power manager may restrict a finite electrical cell from powering a device that is "already charged."

In some embodiments the power manager may be configured to repeat block 106 periodically to determine whether the profile of a consumption device has changed. In some instances this may be because a user has changed the priority of the device. In others, it may be because a device that is connected to the power manager but was previously considered "already charged" has consumed energy from its internal battery, and no longer falls under the "already charged" profile.

If the power manager determines that no profile exists that may be applied to the device based on the determined properties, the power manager may establish a profile for the device in block 108. In some instances this may be as simple as establishing an "unidentifiable device" profile, for example, if the power manager is unable to determine any device properties in block 104. In other instances this may be more complex. For example, if the consumption device did not fall under a "high-priority device" profile, but the power manager was able to determine charge level, power properties, and a device identity in block 104, a the power manager may establish a unique secondary-priority profile for this particular device, with the power properties reflected.

In some embodiments the power manager may, upon determining in block 106 that a connected device does not fall under any existing profiles, provide a user with the ability to manually place the device into a profile or create a new profile for that device.

If the power manager determines that a profile does exist that may be applied to the device based on the determined properties in block 106, or after the power manager establishes a device profile in block 108, the power manager determines power configurations (e.g., permissions, set by a user or the power manager, for a finite electrical cell to power a particular device under certain conditions, conditions under which a finite electrical cell may power a device, and the apportionment of a finite electrical cell's charge to one or more devices) for the device profile in block 110. These power configurations may relate to whether the power manager permits a finite electrical cell to power the consumption device when the remaining charge of the finite electrical cell is below a reserve limit. For example, a user may establish a reserve charge limit of 20% of the finite electrical cell's remaining charge for devices in a "high-priority device" profile. In this example, if a consumption device were not considered to be a high-priority device, and 50% of the finite electrical cell's charge remained, the power manager would permit the finite electrical cell to charge the consumption device. However, if only 15% of the finite electrical cell's charge remained, the power manager would not permit the finite electrical cell to charge the consumption device. On the other hand, if a high-priority device were attached to the cell, the power manager would permit the cell to charge the consumption device with the remaining 15% charge. After the power manager determines these power configurations in block 110, the power manager enables the finite electrical cell to charge or prohibits the finite electrical cell from powering the consumption device according to those power configurations in block 112.

Figure 2:
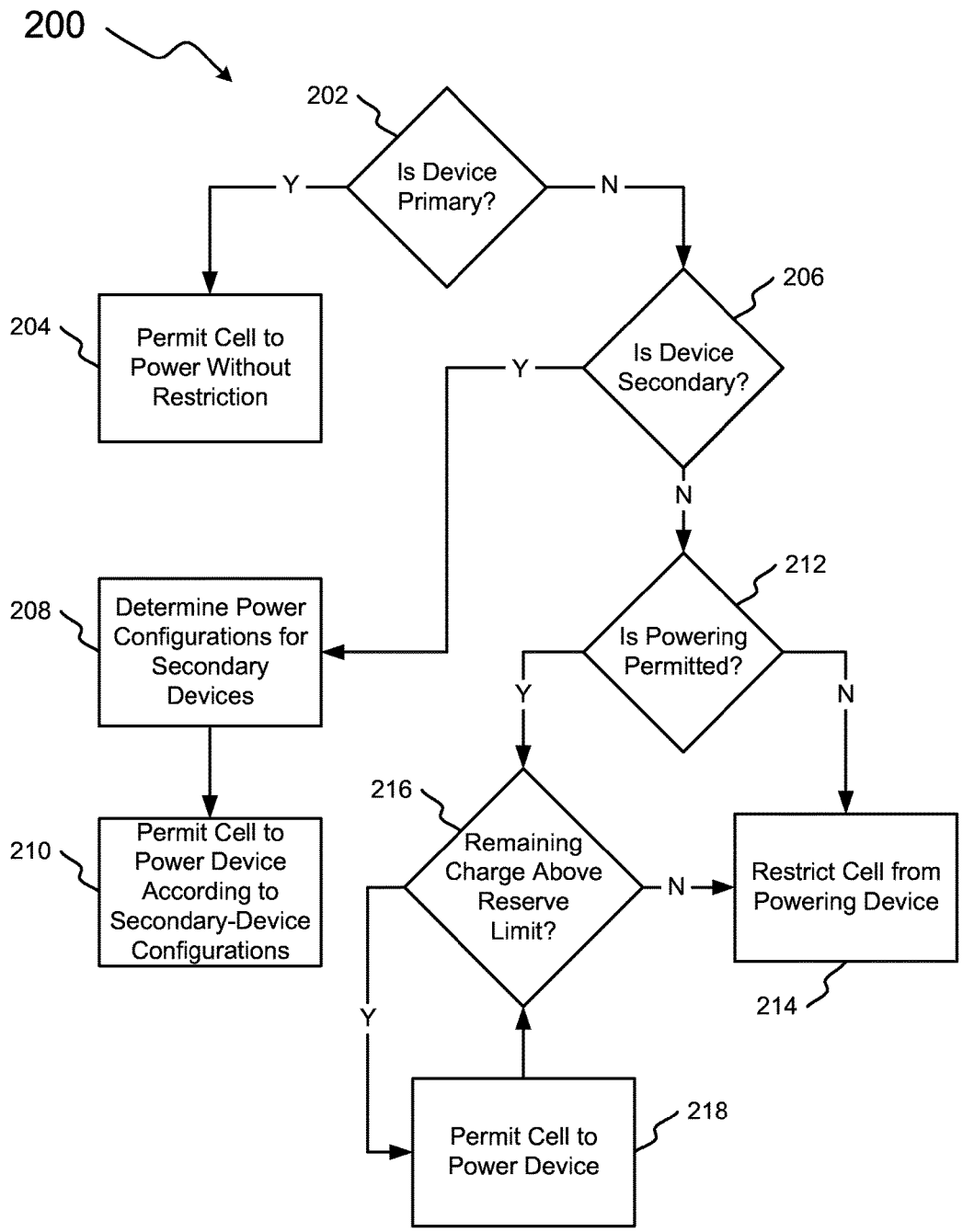
FIG. 2 depicts a method of managing the device-powering activities of a finite electrical cell according to a device profile, in accordance with embodiments.

A more detailed example of determining a consumption device's profile and associated management of a finite electrical cell's powering of that device is shown by method 200 in FIG. 2. In the embodiments illustrated by FIG. 2, a power manager may have established three consumption-device profiles: (1) primary device, (2) secondary device, and (3) tertiary device. A primary device may be the consumption device or devices for which a user may most wish to ensure charge is available. For some users this may be a cellular phone, whereas for others it may be a piece of medical equipment or, for deployed military personnel, a communications or navigation device. In this embodiment, only primary devices are permitted by the power manager to be charged when the finite electrical cell's remaining charge is below a reserve limit. A secondary device may be a consumption device that is not of a high-enough priority to be a primary device, but for which the power manager is able to determine device properties and assign corresponding power configurations. Secondary devices may be devices with communication abilities but that may be considered to be a lower priority than primary devices, such as modern music players or tablets, in some embodiments. A tertiary device, in this embodiment, may be a device for which no properties may be determined by the power manager, or for which a property has been determined but is otherwise considered to be of a lower powering priority than a secondary device. In some embodiments tertiary devices may also differ from secondary devices in that tertiary devices may be unable to communicate power properties, such as the current charge level of the consumption device, to the power manager.

After detecting a consumption device and determining at least one property of that consumption device, a power manager determines whether the device is assigned a primary profile in block 202. If the power manager determines that the consumption device is primary, it enables, in block 204, the finite electrical supply to charge the consumption device regardless of the remaining charge in the finite electrical supply. In some embodiments there may be only one primary devices in the primary-device profile, whereas in other embodiments there may be multiple primary devices.

If the power manager determines that the consumption device is not primary, however, the power manager determines in block 206 whether the consumption device is secondary. If the consumption device is a secondary device, the consumption manager determines power configurations for secondary devices in block 208. In this embodiment, those power configurations include that secondary devices are not permitted to be charged if the finite charging cell's remaining charge is below the charging limit. However, in some embodiments they may also or alternatively include other power configurations, some of which are described in relation to FIG. 4. Once power configurations have been determined in block 208, the power manager permits the consumption device to be charged according to those configurations in block 210.

In some embodiments a user may establish a secondary reserve limit as well as a primary reserve limit. In these embodiments, a secondary reserve limit may be a percentage of a finite electrical cell's charge that is higher than a primary reserve, but below which tertiary devices may not be powered. For example, the primary reserve limit may be set to 20%, whereas the secondary reserve limit may be set to 40%. In this example, the power manager may permit the finite electrical cell to charge primary, secondary, and tertiary devices if the cell contained 45% charge capacity. However, if the cell contained only 35% charge capacity, only the charging of primary and secondary devices would be permitted. Finally, if the cell contained 20% or less, the power manager would only permit the finite electrical cell to charge primary devices.

If the charging manger determines, via blocks 202 and 206, that the consumption device is neither secondary nor primary, the power manager concludes in this embodiment that the consumption device is a tertiary device, and the power manager determines in block 212 whether charging of tertiary devices is permitted. For example, in some embodiments a battery may only be permitted to charge certain pre-determined consumption devices. This could be useful to increase the likelihood that the battery's remaining charge would be available for high-priority devices. This could also be useful in embodiments with a large fleet of consumption devices divided into groups, each group assigned to a separate battery. In such embodiments the consumption devices of each battery could be configured to be primary and secondary devices of that battery, whereas all other consumption devices could be configured to be tertiary devices. This would prevent unwanted intermingling or loss of batteries between groups. Such embodiments are also discussed in connection with FIG. 8.

If charging of tertiary device is not permitted, per block 212, the power manager prohibits the finite electrical cell from charging the consumption device in block 214. In some embodiments this may involve the power manager itself interrupting the flow of electricity between the finite electrical cell and the consumption device, (e.g., by opening a circuit). In other embodiments the power manager may send a command to the charging device or a device coupled to the charging device to disable charging.

In this embodiment, if the power manager determines that charging of tertiary devices is permitted, it determines whether the remaining charge of the finite electrical cell is above the reserve limit in block 216. In this embodiment, the applicable reserve limit is the higher of the primary and secondary reserve limit (if a secondary reserve limit has been configured). If, for example, there were no secondary reserve limit, the primary reserve limit were 25%, and the finite electrical cell contained 30% of the cell's total charge, the power manager would determine in block 216 that the remaining charge is above the reserve limit. If, however, there were a secondary reserve limit of 40%, the power manager would determine that the remaining charge is below the reserve limit.

If the charging manger determines that the remaining charge is below the reserve limit, it prohibits the charging of the consumption device in block 214. However, if the remaining charge is above the reserve limit, the power manager permits the finite electrical cell to charge the device in block 218. The power manager periodically redetermines whether the remaining charge is above the reserve limit in 216 while the consumption device is charging in 218. If it is determined that the remaining charge has dropped below the reserve limit, the power manager prohibits the charging of the consumption device and stops the finite electrical cell from doing so in 214.

Figure 3:
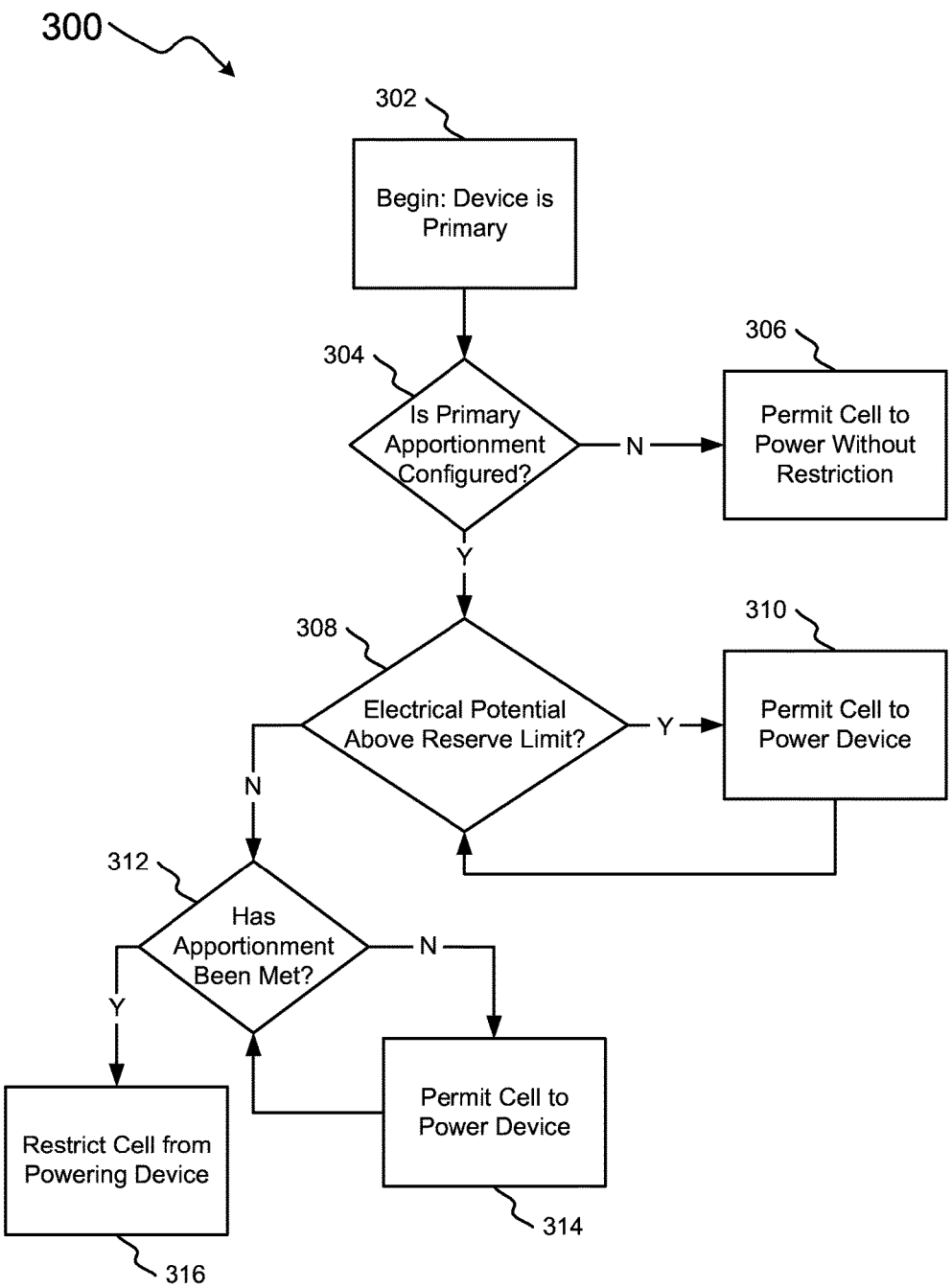
FIG. 3 depicts a method of apportioning a finite electrical cell's remaining charge to one or more consumption devices, in accordance with embodiments.

In embodiments with multiple primary devices, the charge below the reserve limit may be apportioned to the primary devices in various ways. For example, the primary devices may all share one pool of reserved charge (i.e., the pool below the reserve capacity limit). However, in some embodiments each primary device may have its own pool of charge (e.g., 3 primary devices may each be apportioned 5% of the remaining charge, or, in other words, one third of a 15% reserve-limit pool). Such an embodiment is depicted in method 300, shown by FIG. 3. Method 300 begins in block 302 once the power manager has determined that a connected consumption device is a primary device. The power manager proceeds to block 304, in which it determines whether the remaining charge below the primary reserve limit (i.e., the energy that may be used to power only primary devices) has been apportioned to particular primary devices. If apportionment has not been configured (because for example, there is only one primary device, or all primary devices have equal right to the entire charge capacity of the cell), the power manager permits the electrical cell to power the device without restriction in block 306. If, however, primary apportionment has been configured (e.g., each primary device is apportioned 200 C of the charge capacity below the reserve limit), the power manager proceeds to block 308, in which it determines whether the remaining charge capacity of the finite electrical cell is above the reserve limit. If it is (e.g., the reserve limit is 1,000 C, and the cell contains 1,200 C), the power manager permits the cell to power the device in block 310. The power manager periodically redetermines whether the charge capacity is still above the reserve limit in block 308 as the cell is powering the device. If the charge capacity is originally below or at any point thereafter reaches or drops below the primary reserve limit (e.g, the reserve limit is 1,000 C and the cell contains 800 C), the power manager proceeds from block 308 to block 312. In block 312, the power manager determines whether the apportioned amount of energy below the primary reserve limit has been transferred to the device. If it has not, the power manager proceeds to permit the cell to power the device in block 314. The power manager periodically redetermines whether the apportionment has been met in block 312 as the cell is powering the device. If at any point the apportionment has been met, the power manager prohibits the cell from powering the device in block 316.

In further embodiments, groups of primary devices, rather than primary devices themselves, may be apportioned a particular amount of the primary reserve capacity, while the primary devices within each group may each have equal right to the entirety of their group's apportionment. For example, the primary reserve limit of a finite electrical cell may be configured to be 1000 C, and there may be two groups of primary devices, group A and group B, that are each apportioned 500 C of that 1000 C reserve. If the finite electrical cell has 1000 C of charge remaining, the finite electrical cell may be permitted to power any of the devices in group A up to 500 C, but may not provide over 500 C to group A. In such embodiments, the power manager may proceed through method 300 by considering whether the energy apportioned to the group of devices into which the connected device has been placed has been transferred to the group.

Figure 4:
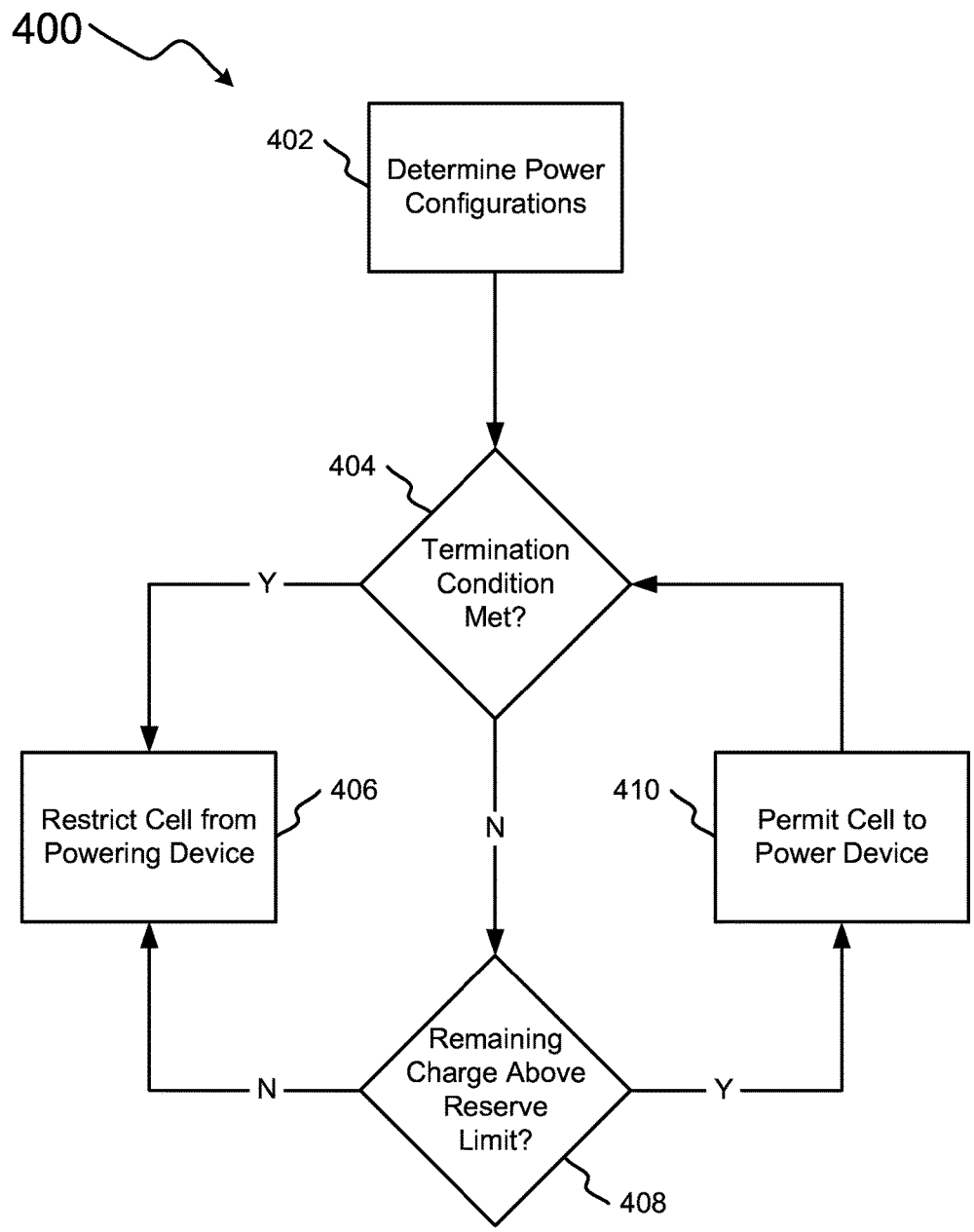
FIG. 4 depicts a method of a first embodiment of managing the device-powering activities of a finite electrical cell based on a preset termination condition.

FIG. 4 provides an illustration of a method 400 by which the charging of a secondary device may be managed by a power manager. After having identified an attached device as secondary, the power manager determines the power configurations that may apply to that particular device in block 402. These configurations may include power configurations that apply to all secondary devices, but may also include conditions related to device-specific properties. For example, a secondary device may communicate a requested termination condition that would govern when the power manager would disable charging of the consumption device. If the consumption device were able to communicate its charge level to the power manager while being charged, a termination condition may be, for example, the consumption device reaching a 30% charge level. The power manager could then permit the finite electrical cell to charge the consumption device until the earlier of (1) the consumption device informing the power manager that it had reached 30% charge level, and (2) the finite electrical cell's remaining charge dropping to a reserve limit of a higher priority than the consumption device's priority. In some similar embodiments, the applicable reserve limit may not restrict the finite electrical cell from powering the secondary device, but may restrict the finite electrical cell to only power the device in accordance with the termination condition. Such an embodiment is discussed in connection with FIG. 5.

A termination condition may also be a set amount of charging time. For example, the consumption device could request 10 minutes of charge, which the power manager could permit the finite electrical cell to provide as long as the cell contained sufficient remaining charge. This may be beneficial if a user has several consumption devices that the user wishes to be given equal charge. In a similar situation, the consumption device may request a certain percentage of the finite electrical cell's remaining above-reserve charge. Such a request may take several forms. For example, in embodiments in which a user wishes to charge multiple secondary devices equally but does not know the remaining above-reserve charge of a battery, the user may configure the power manager to determine the remaining above-reserve charge and split it among a set of identified devices. The power manager would then permit the battery to only charge each device for its percentage share. Such an embodiment is discussed in connection with FIG. 8.

In another embodiment, a user may know the remaining above-reserve charge of a battery, and may wish to ensure that a secondary device or a set of secondary consumption devices does not exhaust it. In this embodiment, the user may configure the power manager to apportion only a certain percentage of that remaining above-reserve charge to the single or set of secondary devices. This may be done in various ways. For example, the user could identify the specific devices to the power manager (e.g., through a near-field communication link) or configure the power manager to only permit the battery to expend the determined certain percentage on the next device or set of device, depending on the number of secondary devices in the set.

Termination conditions may be communicated to a power manager in any method by which consumption-device properties could be communicated to a power manager. In some embodiments, for example, a user may direct the request for a termination condition to be communicated through an interface on the secondary device or set of devices, on the power manager, on the finite electrical cell, or on an otherwise connected device, such as a computer or smart phone. These requests may be communicated when the power manager detects the connected device, or in advance (e.g., when configuring powering profiles and reserve limits).

Upon determining the charging conditions for an attached secondary device in block 402, the power manager attempts to determine in block 404 whether the requested termination condition or conditions, if any, have been met. If the termination condition has already been met, the power manager prohibits the finite electrical cell from charging the secondary device in block 406. If the termination condition has not been met, the power manager determines whether the remaining charge of the finite electrical cell is above the reserve limit in block 408. In some embodiments this determination may be satisfied if any charge is available above the reserve limit, regardless of the amount (e.g., if the reserve limit is 20% and the finite electrical cell contains 21% remaining charge). In other embodiments this determination may be satisfied only if there is sufficient remaining charge above the reserve limit to charge the secondary device or set of secondary devices until the termination condition is met. For example, a connected secondary device may request 100 C of power, but the finite electrical cell with a primary reserve limit of 500 C may only have 550 C of charge remaining (i.e., 50 C of charge that may be transferred to the secondary device). In some embodiments, the power manager may permit the finite electrical cell to power the secondary device in this situation for 50 C, because the finite electrical cell has not reached the reserve limit. However, in other embodiments, the power manager may restrict the finite electrical cell from powering the secondary device in this situation, because the primary reserve limit would be reached before the secondary device's termination condition had been met. In some of these latter embodiments the power manager may communicate an error to the user, giving the user an opportunity to lower the secondary device's request to an amount of power (Coulombs or percent of charge) that would the request to be completed (e.g., 50 C, in the above example). Note that while block 408 is performed after block 404 as presented in FIG. 4, in some embodiments the reserve-limit determination may occur prior to the termination-condition determination.

If the power manager determines in block 408 that the remaining charge is not above the reserve limit, the power manager prohibits the finite electrical cell from charging the secondary device in block 406. However, if the remaining charge is above the reserve limit, the power manager permits the finite electrical cell to charge the device in block 410. The power manager periodically redetermines whether the termination condition has been met in block 404 or whether the remaining charge is no longer above the reserve limit in block 408 while the device is charging in 410. If either the termination condition is met or the remaining charge drops to the reserve limit, the power manager prohibits the charging of the secondary device in and stops the finite electrical cell from doing so in block 406.

Figure 5:
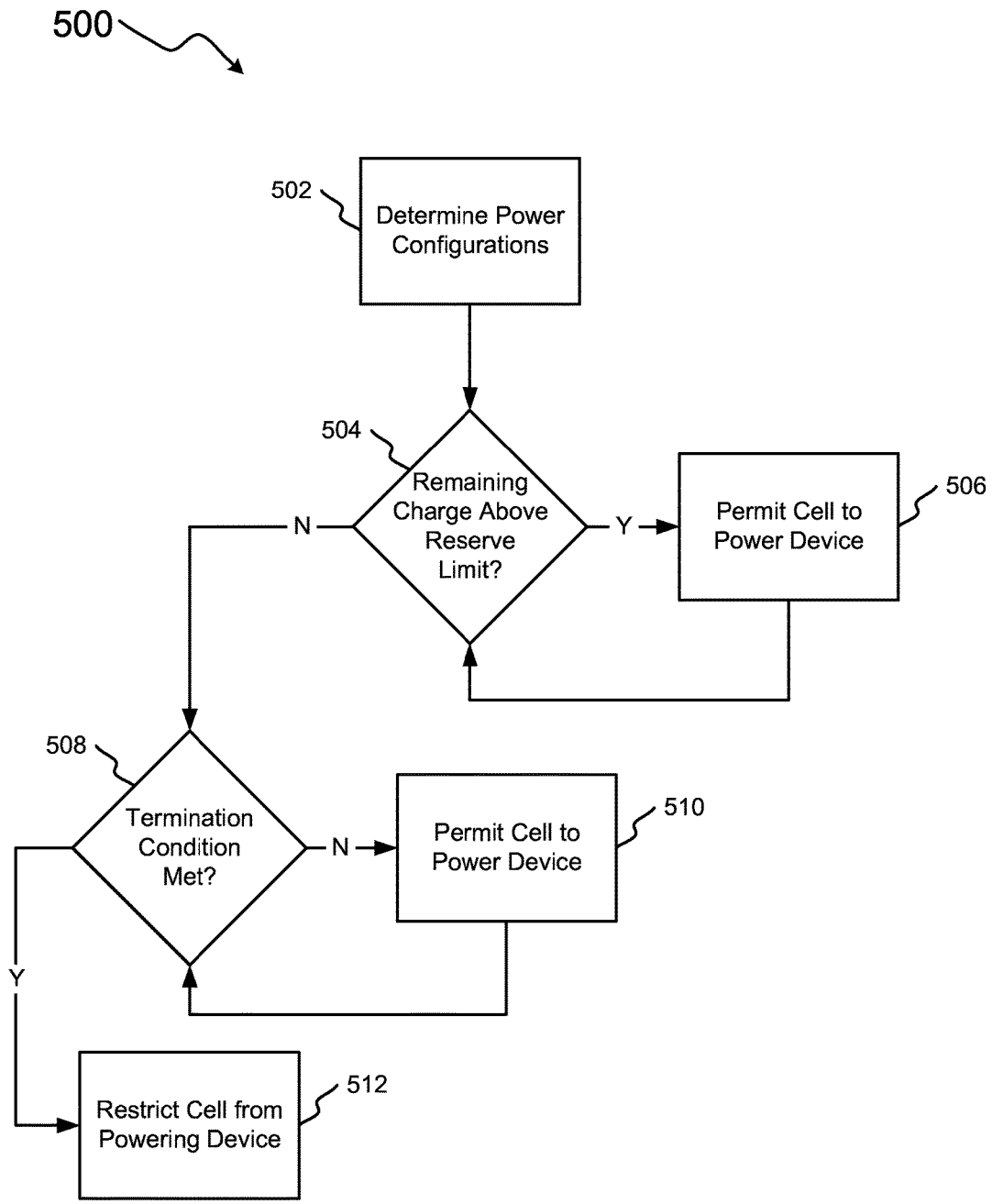
FIG. 5 depicts a method of second embodiment of managing the device-powering activities of a finite electrical cell based on a preset termination condition.

In some embodiments a reserve limit may be established that would not prohibit a device from being charged, but would permit a device to be charged only in a limited capacity. Such an embodiment is illustrated in FIG. 5. In block 502 the power manager determines the powering conditions for the connected device. In this embodiment, this determination would include the applicable reserve limit and the device termination condition that would be applied when the remaining charge is below the reserve limit.

Upon determining the power configurations, the power manager determines in block 504 whether the remaining charge of the finite electrical cell is above the reserve limit. This reserve limit may be a primary reserve limit intended to reserve charge for a class of device that is of a higher priority than the connected device, a reserve limit applicable only to the connected class of device, or of another type. If the remaining charge is above the reserve limit the termination conditions are not applicable, and thus the power manager proceeds to permit the electrical cell to power the device in block 506. While the device is being powered the power manager periodically redetermines whether the remaining charge is above the reserve limit in block 504.

If at any time the remaining charge drops below the reserve limit, the power manager proceeds from block 504 to block 508. In block 508 the power manager determines whether the termination condition has been met. If the termination condition has not been met, the power manager permits the cell to power the device in block 510. While the device is being powered the power manager periodically redetermines whether the termination condition has been met in block 508. If the power manager determines in block 508 that the termination condition has been met, it proceeds to prohibit the cell from powering the device in block 512.

The determination in block 508 may or may not take into account any prior energy transferred to the device by the finite electrical cell. For example, in some embodiments the termination condition may be that the device has been powered for twenty minutes. If the device had previously been powered for seven minutes before the remaining charge was reduced to below the reserve limit (i.e., if the cell powered the device in block 506 for seven minutes), the termination condition may be met in some embodiments once the device had been powered in block 510 for thirteen minutes, or it may not be met until the device had been powered in block 510 for twenty minutes.

In some embodiments the charging of a set of consumption devices may be managed by more than one power manager. For example, a group of consumption devices may share two finite electrical cells, each with a power manager coupled directly thereto. In some such embodiments, both power managers may permit their respective finite electrical cells to power any device in the group (i.e., each consumption device may be powered by either of the two electrical cells). For example, if a group of 8 non-primary and 2 primary consumption devices shared 2 batteries, each with a total charge capability of 10,000 Coulombs (i.e., 10,000 C or 10 kC) and a primary reserve limit of 20%, the total charge between the two batteries would be 20 kC with 4 kC in the primary reserve. Further, if the charge capability of the two batteries were treated as one resource rather than two, a non-primary consumption device could completely deplete the charge of one of the batteries as long as the other battery still maintained at least 4 kC of charge. For such embodiments to be effective, however, some information may need to be shared between the two power managers. For example, each power manager may need to be apprised of the current remaining charge of each finite electrical cell being shared. It may be of added benefit for each power manager to be apprised, for example, of the charge state of each consumption device in the group, and the extent to which each finite electrical cell has recharged a primary consumption device.

Figure 6:
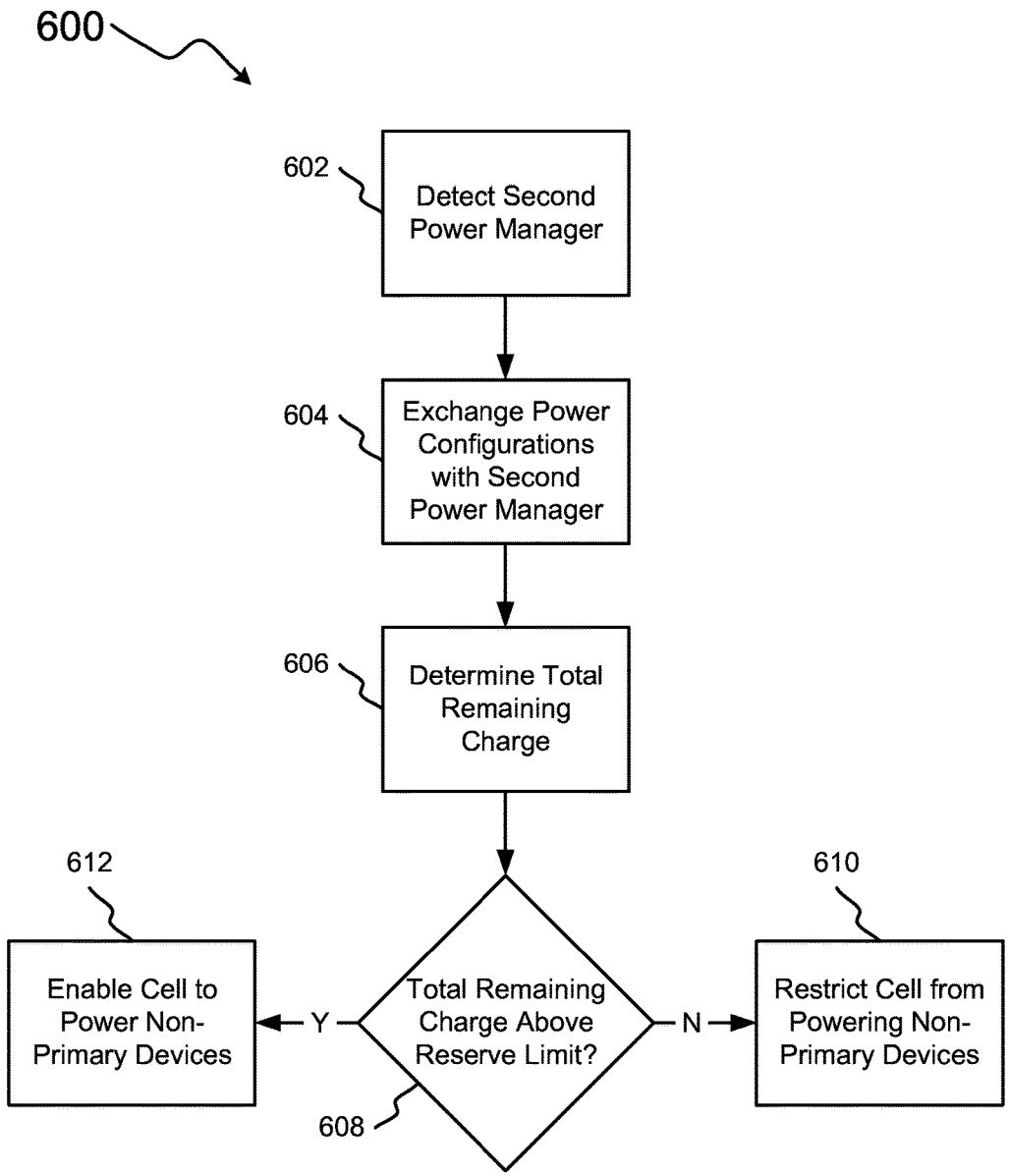
FIG. 6 depicts a method by which a first power manager may exchange power configurations with a second power manager, in accordance with embodiments.

FIG. 6 provides an illustration of a method 600 by which information may be exchanged by power managers in an effort to combine the resources managed by each power manager. While the below describes a first power manager performing each operation of method 600, in some embodiments both the first and a second power manager may perform some or all of blocks 602-612 whether in turn, simultaneously, or otherwise.

In 602 the first power manager detects the second power manager. This detection may take several forms. In some embodiments this detection may be performed automatically by the first power manager using near-field communication (e.g., Bluetooth) as long as the second power manager is within a certain proximity to the first power manager. In other embodiments, one or both power managers may be required to be in some manner of "syncing" mode in which, for example, the one or both power managers may repeatedly either send signals (e.g., pings or identification information) to other power manager or attempt to detect signals sent from other power managers, or both. This syncing mode may be activated, for example, by a button on the housing of the power manager, a software setting in a charging-management application on a user's computer or tablet device, or others. In other embodiments the detection may occur when the two power managers are connected by a physical cable, such as a USB cable.

After the first power manager detects the second power manager, it exchanges power-configuration information of the electrical cells it is managing with the second power manager in block 604. This information may include the number of finite electrical cells the power manager is managing, the current remaining charge of each such electrical cell (e.g., 50% or 2 kC charge remaining), and the reserve limit the power manager is configured to maintain, either per battery or total. In some embodiments power-configuration information may also include the number of primary devices supported by the managed electrical cells and the last-reported charge level of those primary devices.

Exchanging power-configuration information may involve an authentication, such as the first power manager requiring the second power manager to send a pre-established code to the first power manager. Such a pre-established code may be, for example, a user-entered pin (e.g., a 5-digit numerical sequence). In other embodiments the authentication may involve requiring the first and second power managers to be on the same protected wireless network, such as a Wi-Fi network.

Similarly, in some embodiments the exchange of power-configuration information may be the result of a query (e.g., the first power manager, after having detected the second power manager, may only send power-configuration information to the second power manager if the second power manager requests it), or may be initiated by the power manager that is sending information. Further, while in the presented example the first power manager and the second power manager both send charging information to the other, in embodiments this exchange may be one way (e.g., the first power manager may send power-configuration information to the second power manager without the second power manager sending anything to the first power manager).

In the presently illustrated method, after the first power manager exchanges information with the second power manager, the first power manager determines, in block 606, the extent of the total remaining charge provided by the finite electrical cells managed by the first and second power managers. In typical embodiments this may include the charging capabilities of all finite electrical cells of both power managers, but in some embodiments some electrical cells may not be included. For example, in some instances only electrical cells that are physically coupled to the power manager (i.e., within the same housing or within complementary fitted housings, not connected by a cable or through wireless connection) may be included. In other embodiments only electrical cells that have charge remaining (i.e., have not transferred all charging energy to consumption devices) may be included, whereas in some embodiments only electrical cells with a desired charging connector interface (e.g., the USB Type A connector for small devices or SAE J1772 connector for electric vehicles) may be included, and in further embodiments only electrical cells with other certain charging properties (e.g., that charge at a certain voltage) or that fit certain profiles (e.g., lithium-ion batteries vs. lead-acid batteries) may be included.

After determining the total remaining charge of the finite electrical cells managed by both power managers, the first power manager determines in block 608 whether the total remaining charge of those finite electrical cells is above the total reserve limit of both power managers (in this example, a primary reserve limit). If it is, the first power manager would proceed to block 612. If not, it would proceed to block 610. In block 610, the first power manager would prohibit the finite electrical cells under its management from charging non-primary devices. In block 612, the first power manager would enable the finite electrical cells under its management to charge non-primary devices. In some embodiments, this prohibition or enabling may occur when a non-primary device is connected, or while a non-primary device is already charging. In other embodiments this process may occur before a non-primary device is requesting charge from a finite electrical cell.

For example, if the first power manager were configured to maintain a primary reserve limit of 3 kC and the second power manager were configured to maintain a primary reserve limit of 2 kC, the total reserve limit of both power managers would be 5 kC. Thus, if the total remaining charge determined in block 606 were 4 kC, the first power manager would prohibit the finite electrical cells from charging any non-primary consumption devices. If the total remaining charge were 6 kC, however, the first power manager would enable the finite electrical cells to charge both primary and non-primary devices.

In some embodiments the total reserve limit may be reduced based on information related to the primary devices managed by the power manager that is exchanged in block 604. For example, if it is determined that the second power manager maintains a reserve limit of 6 kC between two primary devices (each with 3 kC), but that one of those two devices is fully charged and is drawing power from an AC outlet, the reserve limit may be reduced by the 3 kC apportioned to that consumption device. This would free up more remaining charge for non-primary devices.

In some embodiments the above features may enable users to quickly transfer device identity information, power configurations, reserve limits, and other information between a previously existing battery with attached power manager and newly acquired batteries with attached power managers. In this way the user may increase the amount of batteries available to power his or her consumption devices while ensuring that those new batteries are managed and are seamlessly added to a pool of managed remaining charge.

Figure 7A:
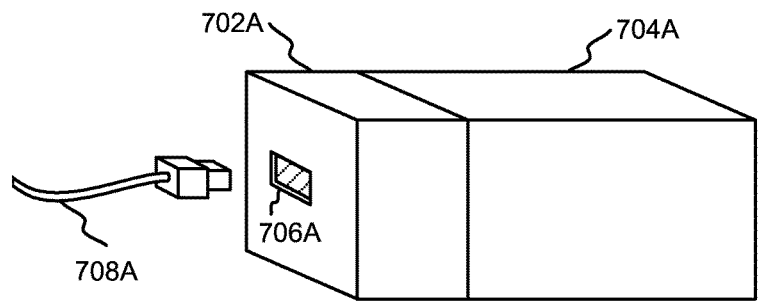
FIG. 7A depicts an example arrangement by which a power manager may be connected to a finite electrical cell and consumption device, in accordance with embodiments.
Figure 7B:
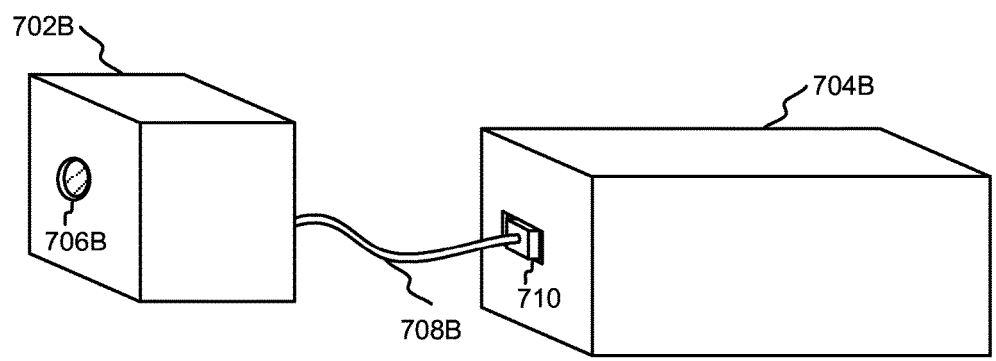
FIG. 7B depicts a second example arrangement by which a power manager may be connected to a finite electrical cell and consumption device, in accordance with embodiments.
Figure 7C:
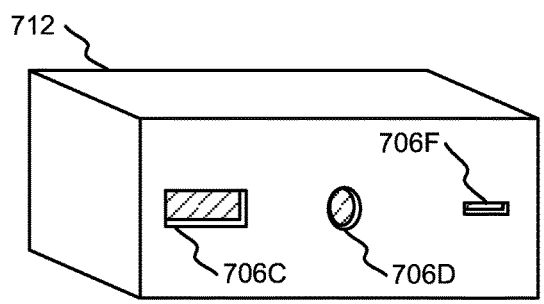
FIG. 7C depicts a third example arrangement by which a power manager may be connected to a finite electrical cell and consumption device, in accordance with embodiments.

FIGS. 7A-7C show three embodiments in which a finite electrical cell may be physically coupled to a power manager. In FIG. A, one Cell 704A is connected to a Power manager 702A such that the Power manager 702A and Cell 704A may appear to be contained within one housing. In some embodiments, Cell 704A and Power manager 702A may indeed be contained within the same housing, whereas in other embodiments Cell 704A and Power manager 702A may be separate components that are designed to interface with each other to form one unit when connected, but two units when disconnected. In such embodiments Cell 704A may be one of several finite electrical cells that are designed to connect with Power manager 702A, such that Power manager 702A is able to interface with a different cell while Cell 704A is unavailable (e.g., being recharged). In some embodiments Cell 704A may actually represent a receptacle for one or more standard form factor batteries, such as one or more AA batteries, the charging capacities of which would then be managed by Power manager 702A upon being inserted into Cell 704A.

In FIG. 7A, Manager 702A contains Port 706A, into which Connector 708A of a consumption device may be inserted for recharging. Note that while in this illustration Port 706A and Connector 708A are depicted with rectangular-shaped interfaces, the embodiments of this disclosure are not intended to be limited to any form factor with which consumption devices may connect to a power manager or finite electrical cell. In some embodiments standard physical interfaces, such as USB Type A or round power plugs, may be used, whereas in other embodiments nonstandard generic or proprietary interfaces may be used, such as a form factor designed to interface with a specific device or class of devices (e.g., the form factors by which many batteries for cordless power tools are inserted into the applicable tool or charger).

In some embodiments Power manager 702A may be physically connected to more than one finite electrical cells (e.g., through two USB cables or two receptacles). In this or similar embodiments one or all of those multiple finite electrical cells may be removable for recharging the cell (e.g., at an AC wall outlet). Note that this disclosure is not intended to be limited to any number or removability of the finite electrical cells that are connected to a power manager.

In FIG. 7B, Power manager 702B and Cell 704B are connected by means of a cable, Connector 708B. Power manager 702B contains circular Port 706B by which a consumption device may be connected for managed charging. Cell 704B contains Port 710 into which Connector 708B may be inserted. In some embodiments Connector 708B may be removed from Port 710, separating Power manager 702B and Cell 704B. In some such embodiments the connector of a consumption device may be inserted into Port 710 after Connector 708B has been removed, allowing for standard, unmanaged charging.

FIG. 7C depicts a similar embodiment in which a power manager and finite electrical cell are located in the physical housing of Charging Device 712. Charging Device 712 contains Ports 706C, 706D, and 706F. In this embodiment three ports of different form factors are depicted, but in other embodiments other numbers or combinations of port form factors are anticipated. In some embodiments Charging Device 712 may be capable of simultaneously charging three different consumption devices with different device properties and profiles. For example, a user's smartphone may be plugged in to Port 706C, a Bluetooth headset may be plugged in to Port 706D, and a tablet configured to communicate with Charging Device 712 may be plugged in to Port 706F. The user may configure the smartphone as a primary device, and further configure a primary reserve limit of 50% of the charge capability of the battery (or in some embodiments, batteries) within Charging Device 712. In this example the energy of the smartphone's battery may be fully exhausted. The user may further decide that the tablet only requires a certain amount of charge (e.g., 10 minutes of charging time or 75% of the tablet's capacity), and may configure an app on the tablet to request that certain amount from Charging Device 712. Finally, the Bluetooth headset may have no charging profile set, but the energy of the headset's battery may be fully exhausted.

If all three of these devices were plugged in to charge at the same time when the battery within Charging Device 712 contained 100% charge capacity, the power manager within Charging Device 712 would detect the devices and determine the properties of the devices, including the smartphone's profile, the tablet's request, and the headset's lack of a profile. In some embodiments the user may be given a prompt with an opportunity to create a profile for the headset before the power manager enables the battery to charge the headset, while in this example the power manager treats the headset as an unidentified device. Because the battery within Charging Device 712 contains over 50% remaining charge (the reserve limit), the power manager would enable the battery to charge all three devices.

If the battery still contained over 50% remaining charge when the tablet reached the requested amount of charge, the power manager would restrict the battery from charging the tablet in Port 706F at that point. Subsequently, if the headset were still charging when the battery reached 50%, the power manager would prohibit the battery from further charging the headset in Port 706D. Because the power manager would have determined that the smartphone is a primary device, the power manager would continue to enable the battery to charge the smartphone in Port 706C until the smartphone were fully charged or the battery's remaining charge reached 0%.

Figure 8:
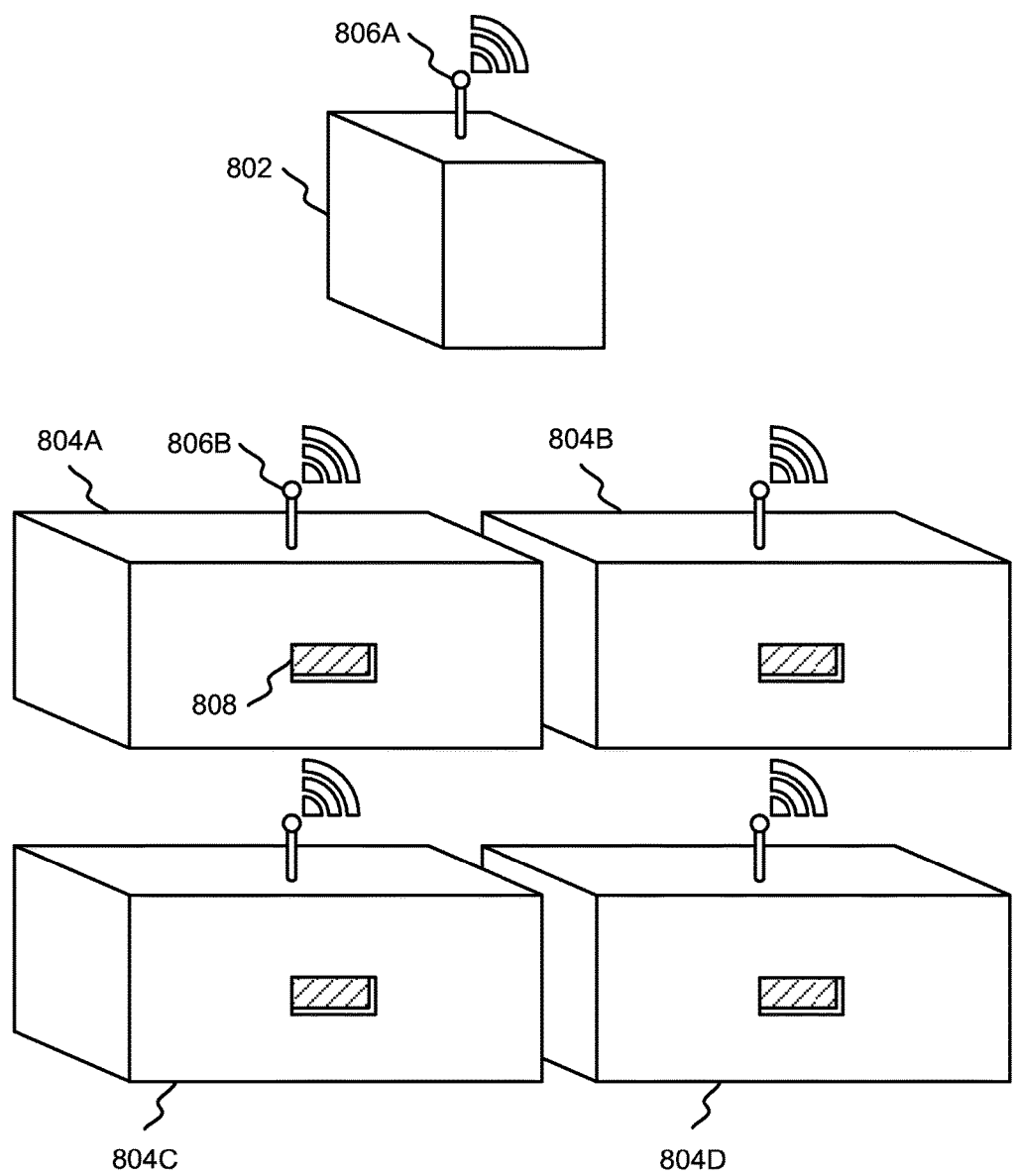
FIG. 8 depicts an example arrangement in which a power manager may be connected to multiple finite electrical cells, in accordance with embodiments.

FIG. 8 illustrates an example embodiment in which a Power manager 802 may manage several finite electrical cells, Cells 804A-804D. Power manager 802 contains Antenna 806A, and Cell 804A, Cell 804B, Cell 804C, and Cell 804D each contain an Antenna 806B. These antennas may enable Power manager 802 to communicate with Cells 804A-804D in a wireless fashion (e.g., through near-field communication, Wi-Fi, or cellular frequencies). Cells 804A-804D each contain Port 808 into which a connector of a consumption device may be inserted for charging.

In some embodiments Power manager 802 may be a dedicated charging hub without the ability to provide charge to consumption devices. For example, Power manager 802 may be a personal computer, tablet, or other device with a graphical user interface contained in a separate housing than Cells 804A-804D. In other embodiments Power manager 802 may be physically coupled with one of Cells 804A-Cells 804D or a similar finite electrical cell, and may manage that cell wirelessly or through a physical connection. In some embodiments Power manager 806A may communicate with other power managers in an effort to combine the charge capabilities of the finite electrical cells that power manager 806A and the other power managers are managing, as discussed in FIG. 6.

In some embodiments each of Cells 804A-804D may support a group of consumption devices that may only be charged by that cell. This could be managed through the profiles of those consumption devices. For example, Cell 804A may support devices A1, A2, and A3, and Cell 804B may support devices B1, B2, and B3. Devices A1-A3 may have a device profile "Group A," which would signify to Power manager 802 that they are only to be charged by Cell 804A. Similarly, devices B1-B3 may have a device profile "Group B," signifying that they are only to be charged by Cell 804B. If, then, device B3 were connected to Cell 804A through Port 808, Power manager 802 would determine the device profile and restrict Cell 804A from charging the device. If device B3 were plugged in to Cell 804B, however, the Power manager 802 may permit Cell 804B to charge the device. In similar embodiments, a finite electrical cell may not necessarily be prohibited from powering devices outside that cell's assigned group (e.g., device B3 for Cell 804A), but may only be prohibited from powering a non-assigned device if that cell contains, or the cells in total contain, a remaining charge below an established reserve limit. In these embodiments, the devices in a cell's group may be considered to be the primary devices of that cell, whereas the devices not in that cell's group may be considered to be secondary (or otherwise non-primary) devices.

In some related embodiments, the devices assigned Cells 804A-Cells 804D may have different profiles that result in the devices being assigned different charging priorities. Using a camping trip as an example application, Cell 804A may be a car battery that is managed by a power manager, device A1 may be the car from which the battery is taken, device A2 may be an electric stove, and device A3 may be an electric motor for a fishing boat. A user may set the car as a primary device and set the primary reserve for Cell 804A to 30% of remaining charge. Power manager 802 would then prohibit the battery from powering the electric stove and the electric motor, but not the car, when the battery is at 30% remaining charge or lower. In such an example, the user may increase the chances that the battery would have enough remaining charge at the end of the camping trip to start his or her car without requiring the user to track the battery capacity during the trip.

In the same example, Cell 804B may be a backup 9 kC battery charger for small consumer devices and devices B1-B3 may each be a handheld videogame device belonging to one of the user's three children. The user may establish the device profiles such that Power manager 802 would prohibit the backup battery charger from transferring more than 3 kC to any single device. In such an example, the user may increase the chances that no child uses more than his or her share of charge without requiring the user to track the use of the backup battery charger.

In some embodiments, Cells 804A-804D may share one group of consumption devices that may contain one or more profile restrictions. For example, Cells 804A-804D may all contain Type A USB ports, and Power manager 802 may be a physical device or may be a program embedded in the software of the user's home computer that communicates with Cells 804A-804D using Antenna 806A. A user may utilize Power manager 802 to manage the charging of all consumption devices that are capable of being charged over a Type A USB cable in the user's home. The user may configure profiles for the devices such that, for example, Power manager 802 would enable any of Cells 804A-804D to recharge any device, provided that Cells 804A-804D together contained enough remaining charge to provide sufficient charge for the primary devices in the group of devices (e.g., primary devices A1 and B1 among consumption devices A1-A3 and B1-B3).

Figure 9:
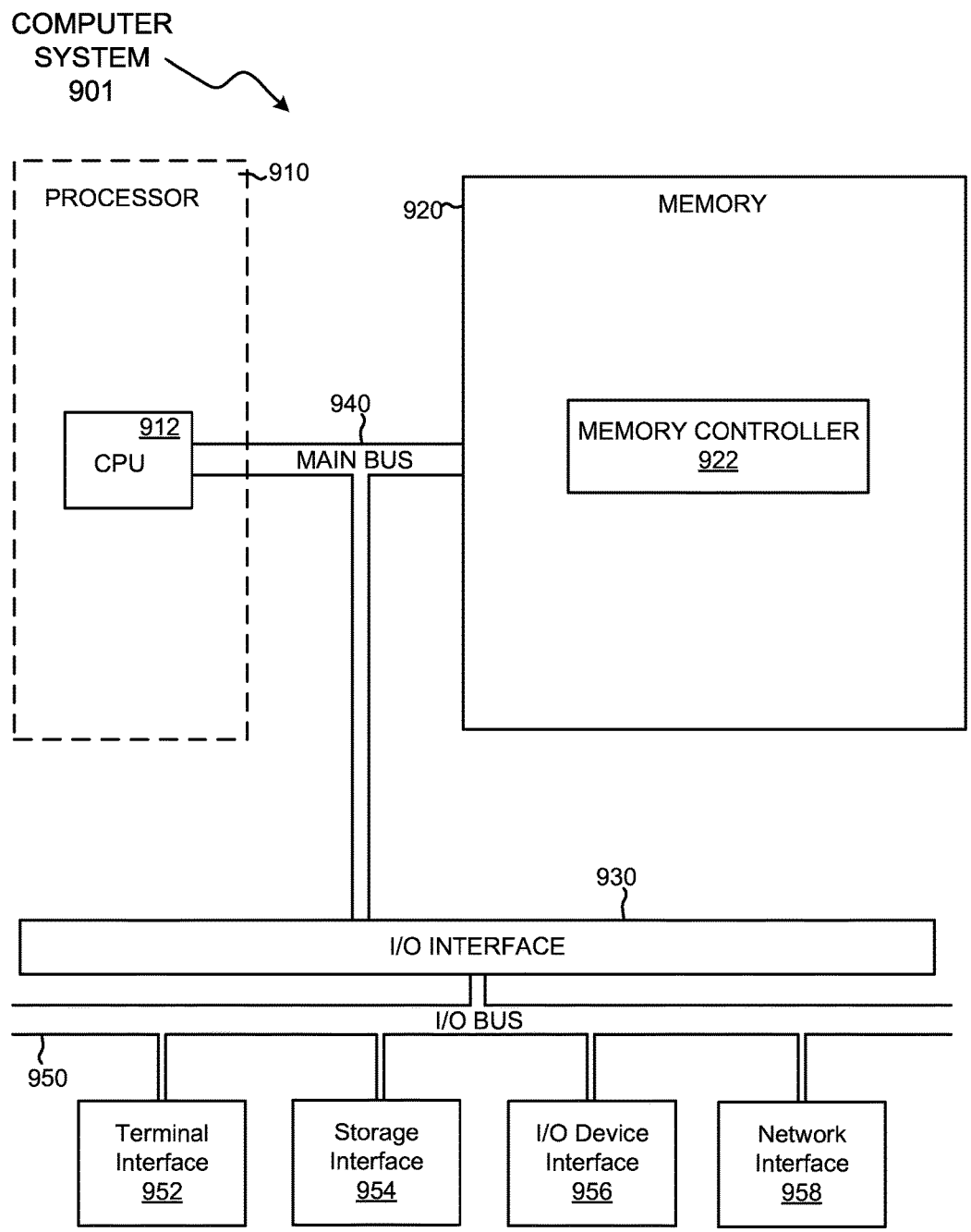
FIG. 9 depicts an embodiment of a representative computer system, according to embodiments of the present disclosure.

FIG. 9 depicts the representative major components of an exemplary Computer System 901 that may be used in accordance with embodiments of the present disclosure. For example, in some embodiments, computer system 901 may be a power manager. The particular components depicted are presented for the purpose of example only and are not necessarily the only such variations. The Computer System 901 may comprise a Processor 910, Memory 920, an Input/Output Interface (also referred to herein as I/O or I/O Interface) 930, and a Main Bus 940. The Main Bus 940 may provide communication pathways for the other components of the Computer System 901. In some embodiments, the Main Bus 940 may connect to other components such as a specialized digital signal processor (not depicted).

The Processor 910 of the Computer System 901 may be comprised of one or more CPUs 912. The Processor 910 may additionally be comprised of one or more memory buffers or caches (not depicted) that provide temporary storage of instructions and data for the CPU 912. The CPU 912 may perform instructions on input provided from the caches or from the Memory 920 and output the result to caches or the Memory 920. The CPU 912 may be comprised of one or more circuits configured to perform one or methods consistent with embodiments of the present disclosure. In some embodiments, the Computer System 901 may contain multiple Processors 910 typical of a relatively large system. In other embodiments, however, the Computer System 901 may be a single processor with a singular CPU 912.

The Memory 920 of the Computer System 901 may be comprised of a Memory Controller 922 and one or more memory modules for temporarily or permanently storing data (not depicted). In some embodiments, the Memory 920 may comprise a random-access semiconductor memory, storage device, or storage medium (either volatile or non-volatile) for storing data and programs. The Memory Controller 922 may communicate with the Processor 910, facilitating storage and retrieval of information in the memory modules. The Memory Controller 922 may communicate with the I/O Interface 930, facilitating storage and retrieval of input or output in the memory modules. In some embodiments, the memory modules may be dual in-line memory modules.

The I/O Interface 930 may comprise an I/O Bus 950, a Terminal Interface 952, a Storage Interface 954, an I/O Device Interface 956, and a Network Interface 958. The I/O Interface 930 may connect the Main Bus 940 to the I/O Bus 950. The I/O Interface 930 may direct instructions and data from the Processor 910 and Memory 920 to the various interfaces of the I/O Bus 950. The I/O Interface 930 may also direct instructions and data from the various interfaces of the I/O Bus 950 to the Processor 910 and Memory 920. The various interfaces may comprise the Terminal Interface 952, the Storage Interface 954, the I/O Device Interface 956, and the Network Interface 958. In some embodiments, the various interfaces may comprise a subset of the aforementioned interfaces (e.g., an embedded computer system in an industrial application may not include the Terminal Interface 952 and the Storage Interface 954).

Logic modules throughout the Computer System 901— including but not limited to the Memory 920, the Processor 910, and the I/O Interface 930—may communicate failures and changes to one or more components to a hypervisor or operating system (not depicted). The hypervisor or the operating system may allocate the various resources available in the Computer System 901 and track the location of data in Memory 920 and of processes assigned to various CPUs 912. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   detecting, by a first processor associated with a finite electrical cell, a first consumption device, a second consumption device, and a third consumption device;
   determining, by the first processor, that the first consumption device and the third consumption device each have a first property and that the second consumption device has a second property;
   establishing, by the first processor, a first power configuration for the first consumption device and the third consumption device based on the first property, wherein the first power configuration comprises a permission to power the first consumption device and the third consumption device without restriction;
   determining that a charge level of the second consumption device is below an established higher charge level;
   establishing, by the first processor, a second power configuration for the second consumption device based on the second property;
   wherein the second power configuration comprises a restriction from powering the second consumption device past the established higher charge level of the second consumption device when the remaining charge of the finite electrical cell is less than a first reserve limit;
   concluding, by the first processor, that the remaining charge of the finite electrical cell is less than the first reserve limit, wherein the first reserve limit is greater than zero;
   permitting, by the first processor, the finite electrical cell to power to first consumption device based on the first power configuration;
   permitting, by the first processor, the finite electrical cell to power the second consumption device based on the concluding, the second power configuration, and the determining that the charge level is below the established higher charge level;
   receiving, by the first processor, an updated charge level of the second consumption device; and
   restricting, by the first processor, the finite electrical cell from powering the second consumption device when the established higher charge level is reached based on the concluding and the second power configuration.

2. The method of claim 1, wherein the first property comprises a first consumption-device profile of the first consumption device and the third consumption device.

3. The method of claim 2, wherein the first consumption-device profile comprises a priority of the first consumption device and the third consumption device.

4. The method of claim 1, further comprising establishing a second consumption-device profile based on the second property.

5. The method of claim 1, wherein the first property comprises a charge level of the first consumption device.

6. The method of claim 1, wherein the first power configuration comprises an apportionment of the finite electrical cell's remaining charge between the first consumption device and the third consumption device.

7. The method of claim 1, wherein the second property comprises a termination condition requested by the second consumption device, under which the first processor is to restrict the finite electrical cell from powering the second consumption device.

8. The method of claim 7, wherein the termination condition is only applicable when the remaining charge of the finite electrical cell is below a second reserve limit.

9. The method of claim 1, wherein the finite electrical cell comprises a standard form-factor battery and wherein the first processor is coupled to the finite electrical cell through a receptacle for the finite electrical cell.

10. The method of claim 2, wherein establishing the first consumption device profile comprises setting the first consumption device as a primary device.

11. The method of claim 4, wherein determining the second consumption device profile comprises setting the second consumption device as a secondary device.

12. The method of claim 11, wherein the second power configuration comprises a restriction that prohibits the finite electrical cell from powering the secondary device, regardless of the charge level of the secondary device, when the remaining charge of the finite electrical cell is less than the second reserve limit.

13. A power manager apparatus comprising:
   a housing with at least one input plug and at least one output port, wherein the input plug is a standard Universal Serial Bus form factor; and
   a processor, wherein the processor is configured to perform a method comprising:
      detecting a finite electrical cell connected through the at least one input plug;
      identifying a charge capacity of the finite electrical cell;
      detecting a consumption device inserted into the at least one output port;
      determining a power configuration for the consumption device, wherein the power configuration comprises a restriction from powering the consumption device past an established higher charge level of the consumption device when the charge capacity of the finite electrical cell is less than a reserve limit, wherein the reserve limit is less than zero;
concluding, based on identifying the charge capacity, that the charge capacity of the finite electrical cell is greater than the reserve limit;
permitting, based on the concluding, the finite electrical cell to charge the consumption device;
identifying an updated charge capacity of the finite electrical cell;
concluding, based on the identifying the updated charge capacity, that the charge capacity of the finite electrical cell is less than the reserve limit;
detecting that a charge level of the consumption device is below the established higher charge level;
permitting the finite electrical cell to continue to charge the consumption device based on the concluding that the charge capacity is less than the reserve limit and the detecting that the charge level is below the established higher charge level;
detecting that the charge level of the consumption device equals the established higher charge level; and
restricting the finite electrical cell from continuing to charge the consumption device based on the concluding that the charge capacity is less than the reserve limit and the detecting that the charge level equals the established higher charge level.

14. A method comprising:
detecting a first processor associated with a first finite electrical cell and a second processor associated with a second finite electrical cell;
forming a first charge group, wherein the first charge group comprises the first finite electrical cell and the second finite electrical cell;
calculating a first reserve limit of the charge group;
detecting a consumption device interfaced with the first finite electrical cell;
identifying a first charge capacity of the first finite electrical cell and a second charge capacity associated with the second finite electrical cell;
determining, based on the identifying, that the sum of the first charge capacity and the second charge capacity is below the first reserve limit;
restricting, based on the determining, the first finite electrical cell from charging the consumption device;

detecting a third processor associated with a third finite electrical cell;
updating the first charge group to comprise the first finite electrical cell, the second finite electrical cell, and the third finite electrical cell;
identifying a third charge capacity of the third finite electrical cell;
concluding, based on the identifying the first charge capacity and the second charge capacity and the identifying the third charge capacity, that the sum of the first charge capacity, the second charge capacity, and the third charge capacity is above the first reserve limit; and
permitting, based on the concluding, the first finite electrical cell to charge the consumption device.

15. The method of claim 14, further comprising:
determining a power configuration for the consumption device, wherein the power configuration comprises a restriction from powering the consumption device past an established charge level of the consumption device when the charge capacity of the first charge group is less than a reserve limit, wherein the reserve limit is less than zero; and
detecting that a first charge level of the consumption device is above the established charge level.

16. The method of claim 15, wherein the restricting is also based on the power configuration and the detecting that the charge level is above the established charge level.

17. The method of claim 16, further comprising:
identifying a fourth charge capacity of the first finite electrical cell;
determining, based on the identifying the fourth charge capacity and the identifying the second charge capacity and the identifying the third charge capacity, that the sum of the fourth charge capacity, the second charge capacity, and the third charge capacity is below the first reserve limit;
restricting, based on the determining that the sum of the fourth charge capacity, the second charge capacity, and the third charge capacity is below the first reserve limit, the first finite electrical cell from charging the consumption device;
detecting that a second charge level of the consumption device is below the established charge level; and
permitting the first finite electrical cell to charge the consumption device based on the detecting that the charge level is below the established charge level.

* * * * *